United States Patent [19]
Gibson

[11] 3,936,338
[45] Feb. 3, 1976

[54] ENDLESS FIBREGLASS BELTING

[75] Inventor: Howard Thomas Gibson, Keighley, England

[73] Assignee: Fothergill & Harvey Limited, Summit, England

[22] Filed: Nov. 18, 1974

[21] Appl. No.: 524,897

[30] Foreign Application Priority Data
Nov. 28, 1973 United Kingdom............... 55150/73

[52] U.S. Cl. ................ 156/157; 156/158; 156/306; 156/344; 156/505; 156/535; 156/583; 428/57
[51] Int. Cl.² ......................................... B65H 69/06
[58] Field of Search .......... 156/157, 158, 159, 178, 156/179, 306, 344, 502, 505, 506, 535, 176, 544, 545, 583; 428/57

[56] References Cited
UNITED STATES PATENTS

| | | | |
|---|---|---|---|
| 1,261,118 | 4/1918 | Geisel | 156/157 |
| 3,332,831 | 7/1967 | Stoller | 156/306 |
| 3,449,185 | 6/1969 | Plenderleath | 156/306 |
| 3,487,871 | 1/1970 | Kanamori | 156/304 |

Primary Examiner—William A. Powell
Assistant Examiner—Brian J. Leitten
Attorney, Agent, or Firm—Norris & Bateman

[57] ABSTRACT

A method for joining the ends of an endless belt or for joining two belts side by side by stripping the weft from the ends of the belt or by stripping the warp from the adjoining sides of the belt; interdigiting the protruding weft or warp ends and applying a film of a thermo-plastic material therebetween and above and below the joint and bonding the joint by heat and pressure.

6 Claims, 6 Drawing Figures

ENDLESS FIBREGLASS BELTING

This invention relates to an improved method for the production of endless woven belts and more particularly to PTFE coated fibre glass belting.

According to the invention a method for jointing an endless belt formed from woven fibre glass yarn coated with a plastics material comprises applying coated fibre glass tapes having a film of heat fusible, high temperature resistant material, sandwiched between the two layers of the coated glass fabric across each of the ends of the belt, heating the tapes to soften the plastics material laminated therebetween, stripping the tapes from the belt with the plastics coating, removing the weft yarn from the stripped portions, interdigiting the stripped warp or weft ends, applying a film of a heat fusible high temperature resistant plastics material above and below the interdigited warp or weft ends to form a joint and heating the joint to cause the films to adhere to the warp or weft ends and to consolidate together.

The invention will be described with reference to the accompanying drawings:-

A woven fibre glass belt $A^1$ coated with a plastics material such as PTFE is cut to length with an excess of say one inch for jointing the ends. A tape B of similar PTFE coated glass fibre having a film of heat fusible high temperature resistant material, sandwiched between the two layers of PTFE coated glass fabric is cut to the width of the belt with an overlap at each end and is applied over the top and bottom of each belt end. The tapes B are adhered to the belt ends by the coated tapes of sandwiched interleaf material which may be of PTFE or FEP or other high temperature resistant heat fusible fluoro-polymer material.

Figure 1:
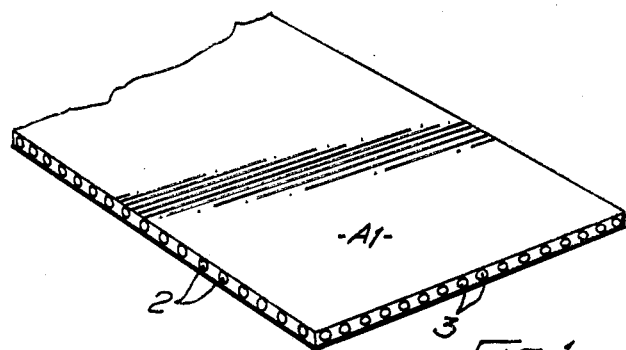
FIG. 1 is a perspective view of a portion of an end of a coated fibre glass belt.
Figure 2:
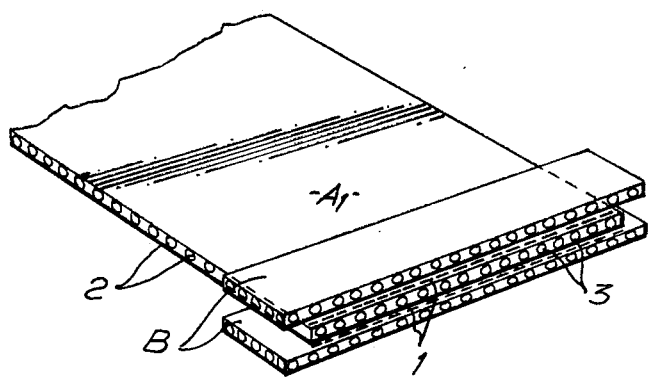
FIG. 2 is a perspective view of one end of a belt showing tapes applied thereto.
Figure 3:
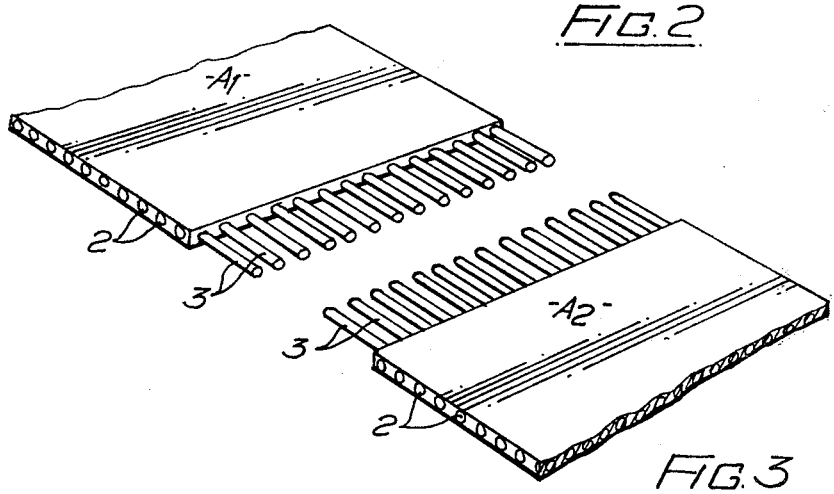
FIG. 3 is a perspective view of the ends of the belt prepared for jointing.

The tapes are bonded to the coating on the belt by the application of heat and after being allowed to cool to ambient temperature are stripped from the belt to remove the coating from each side of the belt $A^1$ together with any PTFE or the like from the sandwiched layer. The weft yarns 2 are now stripped from the exposed ends of the warp ends 3 of the belt to leave the warp ends 3 free as also shown in FIG. 3, the warp ends 3 being trimmed back to say a quarter of an inch.

The belt $A^1$ is transferred to a heat fusion press and aligned and clamped therein on the heater bars of the press.

Figure 4:
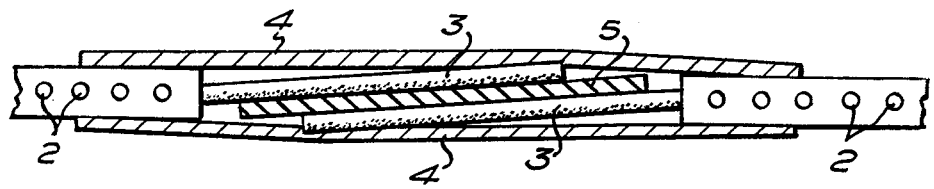
FIG. 4 is a diagrammatic sectional elevation of the joint to an enlarged scale.

A jointing film 4 is applied to the upper and lower surfaces of the exposed warp ends 3 which are interdigited with an intermediate film 5 (FIG. 4). Normally one layer is applied as shown in FIG. 4 but a second layer may be inserted. The bonding films 4,5, may comprise a 0.001 inches thick strip of FEP or other heat fusible polymer.

The thickness of the interleaved heat fusible film is chosen to match the belt thickness so that a fully contoured joint is produced after final fusion.

Figure 5:
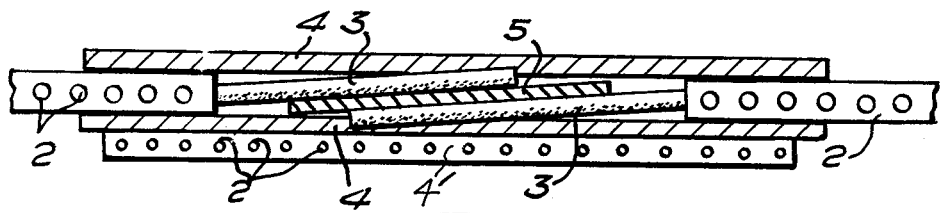
FIG. 5 is a diagrammatic sectional elevation of a further joint reinforced on the underside.

In order to further strengthen the joint, a reinforcing strip $4^1$ of the same material as the belt may be applied to the underside of the belt as shown in FIG. 5. This ensures that the top surface is contoured but the back surface is slightly stepped as for a conventional belt joint. The reinforcing strip $4^1$ is applied over one of the outer layers of FEP or other heat fusible polymer film (see FIG. 5).

After ensuring correct centralisation and alignment of the belt and the constituent jointing laminates on the main beam, the press is closed at said 40 pounds/square inch, current is applied to raise the temperature to the neighbourhood of 350°C and when this temperature is attained the pressure is increased to 60 pounds/square inch.

The belt is now allowed to cool to 120°C before removal from the press and allowed to cool to ambient temperature and trimmed.

The sides of the laminates overlapping the belt are trimmed off to leave the joint of substantially the same thickness as that of the belt $A^1$ to provide a flush joint. The belt may then be provided with reinforcements $4^1$ on the underside of the joint so that the underside is not contoured.

Figure 6:
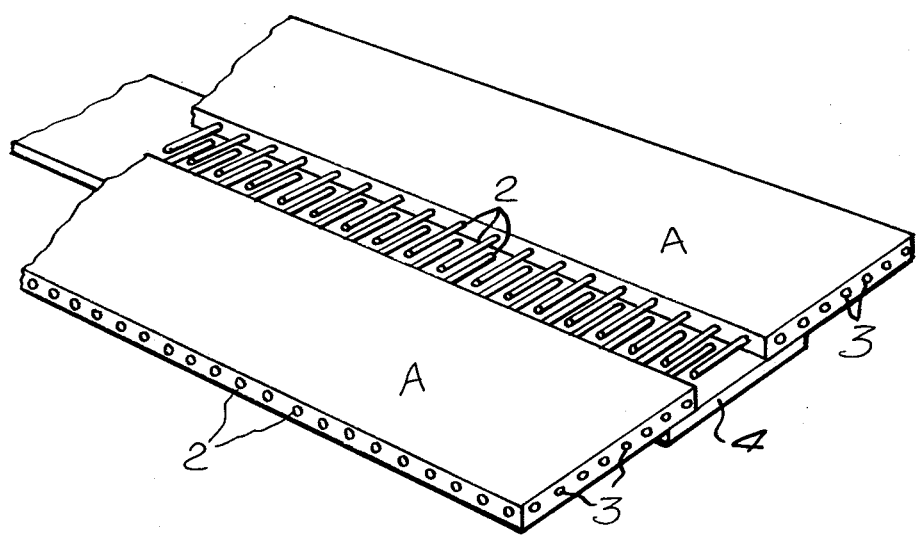
FIG. 6 is a perspective view of parts of two belts joined together longitudinally of the belts with the intermediate film 5 and the top film 4 omitted for clearness.

FIG. 6 shows two belts A joined longitudinally to produce a wider welt in which the tapes B are applied longitudinally of the adjoining edges of the belt to strip the coating therefrom and the warp yarns 3 are removed leaving the ends of the weft yarns 2 exposed to receive the films 4 as hereinbefore described with reference to the jointing of the ends of the belt.

What I claim is:

1. In a method of making a permanent joint between the edges of two woven fiberglass yarn belt sections that are surface coated on both sides with a high temperature resistant heat fusible fluoro-polymer material and wherein the yarns in said belt sections comprise one group extending generally parallel to the belt edges and another group extending generally at right angles to said edges, the steps of
   a. applying strips of glass fibre tape on the upper and lower surfaces of said belt sections along each of the edges to be joined, said tapes having films of heat fusible fluoro-polymer material in contact with the fluoro-polymer material on the belt section ends,
   b. applying heat to fuse said contacting fluoro-polymer materials together,
   c. stripping said tapes off the belt sections for removing along therewith fused coating from the yarns at said belt section edges;
   d. removing the uncoated yarns of said one group, leaving the yarns of said other group projecting at substantially right angles from the belt section edges,
   e. bringing together the belt end sections to be joined and interdigiting the projecting yarns in a joint region,
   f. applying films of high temperature resistant heat fusible fluoro-polymer material over the interdigited yarn region and across the adjacent belt section end surfaces, and g. applying heat and pressure to fuse said films and consolidate them with said belt section edges and the yarns in said region for forming a permanent bonded joint having substantially the thickness of the belt sections.

2. In the method defined in claim 1 wherein said belt sections are longitudinally extending sections having transverse edges to be joined, and said groups of yarns are respectively weft yarns and warp yarns.

3. In the method defined in claim 2 said belt sections being the opposite ends of a single length belt section whereby completion of said joint forms an endless belt.

4. In the method defined in claim 1 wherein said belt sections are longitudinally extending side by side with their adjacent side edges to be joined, and said groups of yarns are respectively warp yarns and weft yarns whereby a belt of increased width is formed.

5. A method for jointing a belt as in claim 1 comprising applying an intermediate film of a heat fusible plastics material between the interdigited yarn ends before bonding the joint.

6. A method of making a belt as in claim 1 comprising trimming off the side edges to leave the joint substantially of the same width as the belt.

* * * * *